United States Patent [19]

Zahradnik

[11] 4,428,687
[45] Jan. 31, 1984

[54] FLOATING SEAL FOR EARTH BORING BIT

[75] Inventor: Anton F. Zahradnik, Corsicana, Tex.

[73] Assignee: Hughes Tool Company, Houston, Tex.

[21] Appl. No.: 497,217

[22] Filed: May 27, 1983

Related U.S. Application Data

[63] Continuation of Ser. No. 262,239, May 11, 1981, abandoned.

[51] Int. Cl.³ .......................... F16C 33/72; F16J 15/34
[52] U.S. Cl. ........................................ 384/94; 175/371; 277/188 R
[58] Field of Search ............................ 384/92, 94, 95; 308/187; 175/371, 372; 277/92, 95, 96, 84, 165, 188 R, 12, 32; 384/130, 151, 152, 153

[56] References Cited

U.S. PATENT DOCUMENTS

| | | | |
|---|---|---|---|
| 2,814,465 | 11/1957 | Green | 308/8.2 |
| 3,244,459 | 4/1966 | Ortloff | 308/8.2 |
| 3,303,898 | 2/1967 | Bercaru | 308/8.2 |
| 4,168,868 | 9/1979 | Shields | 308/8.2 |
| 4,194,795 | 3/1980 | Rife | 308/8.2 |
| 4,256,351 | 3/1981 | Langford | 308/8.2 |
| 4,277,109 | 7/1981 | Crow | 308/8.2 |

Primary Examiner—Stuart S. Levy
Assistant Examiner—David Werner
Attorney, Agent, or Firm—Robert A. Felsman; James E. Bradley

[57] ABSTRACT

An earth boring bit has a bearing seal that floats to accommodate angular and axial movement of the cutter with respect to the shaft. The seal is located in an annular groove formed in the shaft. A supporting ring is located in the groove. The supporting ring has an inner diameter larger than the inner diameter of the groove to provide a clearance for allowing the supporting ring to float. An elastomeric ring is located on the outer circumference of the supporting ring. The supporting ring presses the elastomeric ring into sealing contact with the cutter. The elastomeric ring is also pressed on its sides to provide sealing.

6 Claims, 3 Drawing Figures

FLOATING SEAL FOR EARTH BORING BIT

This application is a continuation of application Ser. No. 262,239, filed May 11, 1981 now abandoned.

BACKGROUND OF THE INVENTION

This invention relates in general to earth boring bits, and in particular to a bearing seal for earth boring bits.

This invention concerns particularly the type of earth boring bit that employs three rotatable cutters mounted on depending bearing shafts. Each conical cutter rotates on its bearing shaft as the drill bit is rotated. The cutter has teeth of tungsten carbide inserts on its exterior for disintegrating the earth. The bearings are usually either a journal type, or they may employ roller bearings. The bearings are supplied with lubricant and sealed by an elastomeric seal located in a groove formed in the bearing shaft at its base.

Because of tolerances, particularly with the roller bearing type bearings, the cutter will have radial, axial and angular movements relative to the bearing shaft. The seal, which usually is in sliding contact with the cutter, will experience varying degrees of pressure because of this movement, tending to cause leakage. There have been several proposals in the past to provide a floating seal that is able to move radially to accommodate the cutter movement.

SUMMARY OF THE INVENTION

This invention provides an improved floating seal for the bearings of an earth boring bit. In the preferred embodiment, a groove for the seal is formed in the shaft near its intersection with the head section. A supporting ring is located in this annular groove. Preferably, the supporting ring is a split ring that can be expanded for installation, however, has a minimum diameter. The minimum diameter is greater than the inner diameter of the groove, providing an annular clearance on the inside of the supporting ring to allow it to float.

An elastomeric ring is located on the outer circumference of the supporting ring, and preferably is an O-ring. The supporting ring urges the elastomeric ring into sealing and sliding contact with the cutter. Means are provided to prevent the O-ring from moving along the axis of the shaft and for providing sealing against the sides of the O-ring. In the preferred embodiment, this consists of a backup ring, which squeezes the O-ring against the sides of the groove and also protects the O-ring from cuttings.

DESCRIPTION OF THE PREFERRED EMBODIMENT

Figure 1:
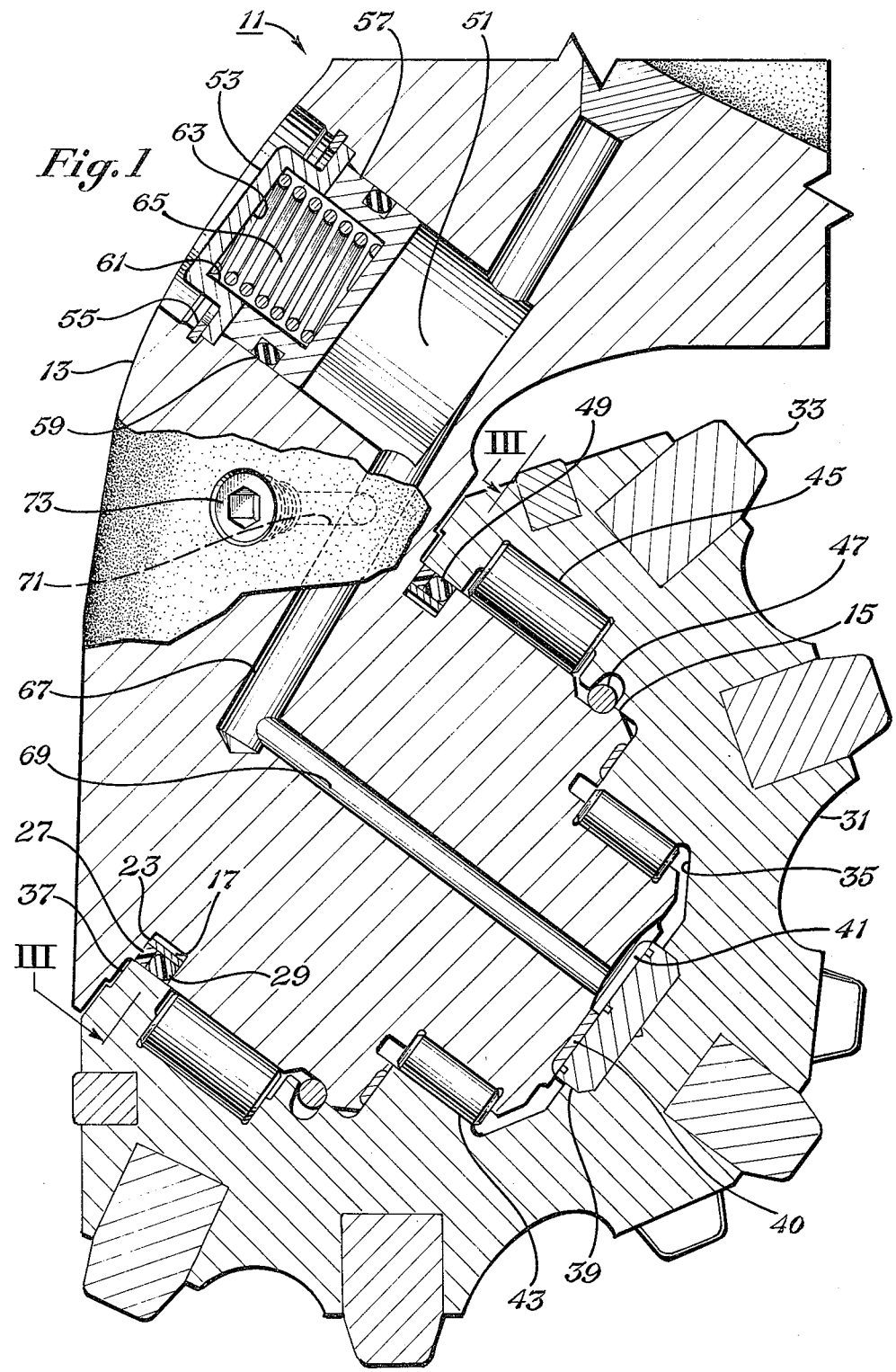
FIG. 1 is a partial vertical sectional view of an earth boring bit constructed in accordance with this invention.

FIG. 1 illustrates an earth boring bit 11 particularly constructed for drilling blast holes for mining. Earth boring bit 11 has three head sections 13 (only one shown), which are subsequently welded together. Each head section 13 has a depending bearing pin or shaft 15. An annular groove 17 is formed in shaft 15 at its intersection with head section 13. Groove 17 is rectangular in transverse cross-section, as shown in FIG. 1, with a depth about the same as its width. Groove 17 is formed normal to the axis of shaft 15.

Figure 2:
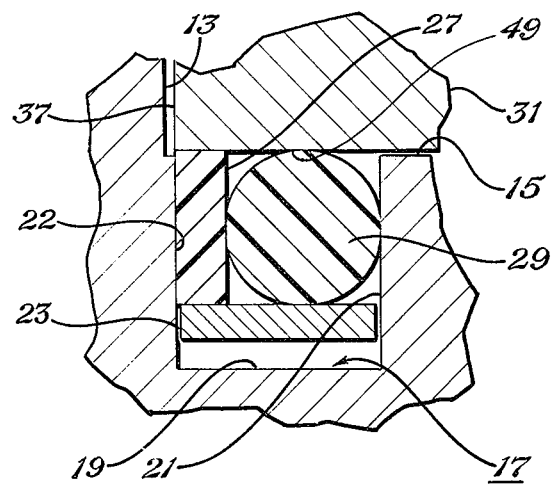
FIG. 2 is an enlarged vertical sectional view of part of the bearing seal of the earth boring bit of FIG. 1.
Figure 3:
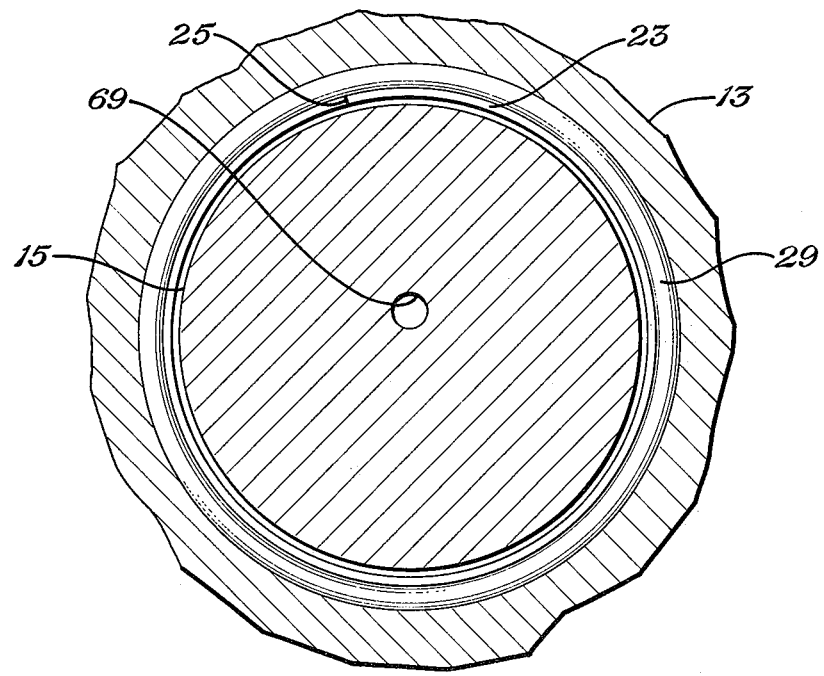
FIG. 3 is a sectional view of the earth boring bit of FIG. 1, taken along the line III—III of FIG. 1.

Referring to FIG. 2, groove 17 has a cylindrical base or inner diameter 19, and inner and outer sidewalls 21 and 22 that are parallel with each other and normal to base 19. A supporting ring 23 is placed inside groove 17 during assembly. Supporting ring 23 is preferably metal, and is cut into at a single point 25, as shown in FIG. 3, for installation. Although supporting ring 23 is stiff, the separation at point 25 enables ring 23 to be expanded for insertion over shaft 15. Once over groove 17, the resiliency of ring 23 will cause the ends of support ring 23 at point 25 to close together as shown in FIG. 3. After installation, the ends of ring 23 could be tack welded back together, if desired. Once installed, ring 23 will be incontractible, defining a minimum diameter or ring 23. Ring 23 is cylindrical and has a width that is slightly less than the width of groove 17 to allow it to move radially in groove 17. The inner diameter of ring 23, when at its minimum diameter position shown in FIG. 3, is greater than the diameter of base 19 by about 1/16 inch. This results in an empty annular space or clearance between ring 23 and base 19 for allowing ring 23 to float or move radially with respect to shaft 15. The outer diameter of ring 23 is less than the outer diameter of groove 17 defining an annular cavity in groove 17 on the outer circumference of ring 23.

A backup ring 27, preferably of an elastomeric material, is located in groove 17, with its inner circumference in contact with the outer circumference of ring 23. Backup ring 27 is rectangular in cross-section and has a cross-sectional width that is about one third the width of groove 17. The cross-sectional height of backup ring 27 is selected so that its outer circumference extends above groove 17.

Sidewall 21, supporting ring 23 and backup ring 27 define an annular space for receiving an elastomeric ring, preferably a conventional O-ring 29. O-ring 29 is circular in transverse cross-section, as shown in FIG. 2. The transverse cross-sectional diameter of O-ring 29 is slightly greater than the cross-sectional width of the annular space provided between backup ring 27 and sidewall 21, to provide sealing and prevent axial movement of O-ring 29. The outer diameter of O-ring 29 is selected so that it will extend above the top of groove 17 a selected amount. The inner diameter of O-ring 29 is the same as the outer diameter of supporting ring 23. In the preferred embodiment, O-ring 29 is softer than backup ring 27, preferably about 90 durometer for backup ring 27 and 7014 80 durometer for O-ring 29.

Referring again to FIG. 1, a cutter 31 of generally conical configuration is mounted rotatably on shaft 15. Cutter 31 has a plurality of cutting elements, such as sintered tungsten carbide inserts 33 on its exterior. Cutter 33 has a central, axial cavity 35 that receives shaft 15. An annular backface 37 surrounds the entrance to cavity 35. Backface 37 is located in a plane that is normal to the axis of bearing pin 15.

In the embodiment shown in FIG. 1, a nose button 39 is mounted in the base of cavity 35 for frictional contact with a mating inlay 40 mounted to the end of the shaft 15. Nose button 39 and inlay 41 are of harder metal than shaft 15 and cutter 31. A slot 41 formed in inlay 40 leads from the center to the side of inlay 40.

A plurality of roller bearings 43, each cylindrical in shape, are mounted between a reduced diameter portion of shaft 15 and cavity 35. A second and larger diameter set of roller bearings 45 are mounted between cavity 35 and shaft 15 immediately inward from groove 17. Cutter 31 is retained on shaft 15 by a snap ring 47 located between the roller bearings 43 and 45. Snap ring 47 fits within mating grooves of cutter 31 and shaft 15, as taught in U.S. Pat. No. 4,236,764, issued to Edward M. Galle on Dec. 2, 1980, all of which material is incorporated by reference. Cutter 31 has a smooth, cylindrical seat 49 formed in cavity 35 between roller bearings 45 and backface 37.

As shown in FIG. 2, O-ring 29 is squeezed between seat 49 and the incontractible supporting ring 23. O-ring 29 will also be under some axial pressure or squeeze between backup ring 27 and groove 21. Backup ring 27 will be in contact with seat 49, but not under any significant radial compression. The particular amount of radial and axial squeeze is selected so as to provide adequate radial sealing between O-ring 29 and cutter seat 49, and axial sealing between O-ring 29, groove 17 and backup ring 27. The squeeze, which is the percent of deformation with respect to transverse cross-sectional dimension in the relaxed condition, should be as low as possible to avoid excessive friction and heat. A pressure differential of about 50–60 psi (pounds per square inch) across O-ring 29 between cavity 35 and the bit exterior, and a temperature of about 200° F. (Fahrenheit) maximum are expected. The squeeze calculations must consider that under this maximum temperature O-ring 29 will volumetrically expand about six percent. Also, preferably the squeeze is less than with prior art, O-ring seals used in drill bits, such as taught in U.S. Pat. No. 3,397,928, which is currently about 17 percent.

The desired range of squeeze is calculated in a conventional manner, taking into consideration manufacturing tolerances. In one embodiment the radial squeeze is in the range from 4.6 to 10.2 percent, and the axial squeeze is 0.3 to 6 percent before assembly. After assembly, the axial squeeze will increase since the radial interference will deform O-ring 29, pressing its sides outward.

The embodiment of FIG. 1 has a cylindrical reservoir 51 sealed from the exterior by a cap 53 retained in place by a retaining ring 55. A piston 57 is slidably and reciprocally carried inside reservoir 51. Piston 57 is sealed in reservoir 51 by an O-ring 59. Piston 57 has a cavity or socket 61 on its upper side that mates with a socket 63 formed in cap 53. A coil spring 65 fits within sockets 61 and 63 and urges piston 57 downward. Spring 65 is shown compressed in FIG. 1 and has the capacity to push piston 57 downward into contact with the base of reservoir 51.

A lubricant passage 67 extends downward through head section 13 from the base of reservoir 51. Another lubricant passage 69 is located parallel with the axis of shaft 15 and extends from the bottom of passage 67 to the end of shaft 15 and through the inlay 40. An entrance port 71 extends from the exterior of head section 13 to passage 67 for introducing lubricant into the reservoir 51. Entrance port 71 is sealed by a removable plug 73.

To assemble bit 11, supporting ring 23 will be slipped over shaft 15 and inserted into groove 17. Backup ring 27 will be placed in groove 17 against outer sidewall 22. Then, O-ring 29 will be drawn over shaft 15 and inserted into groove 17 between backup ring 27 and inner sidewall 21. Roller bearings 43 and 45 will be placed in cavity 35 of cutter 31, and snap ring 47 will be placed in its groove within cutter cavity 35. Then the cutter is pushed over shaft 15 until snap ring 47 snaps into its mating groove in shaft 15. Cutter backface 37 will be located slightly outward from groove 17. The seat 49 in cutter cavity 35 will press and deform O-ring 29.

The three head sections 13 with assembled cutters 31 are then welded together. Threads (not shown) are then machined on the top of the bit for securing to drill pipe. Piston 57 is placed in reservoir 51. Coil spring 65 is placed on top of piston 57 and cap 53 is secured in place. To fill with lubricant, normally a vacuum will be drawn on the system through port 71. After the passages and spaces have been evacuated, lubricant is introduced through port 71, filling reservoir 51, passages 67, 69 and the spaces in cutter cavity 35 between roller bearings 43, roller bearings 45 and shaft 15. Some lubricant will be removed before running to allow for volumetric expansion of the lubricant with temperature increase.

In operation, the bit shown in the figures will be secured to a section of drill pipe and used to drill blast holes for mining purposes. Air will be pumped down the drill string and through the bit out nozzles (not shown) for cooling, and removing cuttings. The static pressure surrounding bit 11 at the bottom of the hole will be atmospheric. The bit will be rotated, with each cutter 31 rotating on each shaft 15. Similar bits having similar seal arrangements may be used in oil, gas, water and other mineral exploration drilling, and the drilling fluid may be a liquid instead of air.

The outer circumference of O-ring 29 will be in sliding contact with cutter seat 49. The pressure on the sides of O-ring 29 between sidewall 21 and backup ring 27 will normally prevent supporting ring 23, O-ring 29 and backup ring 27 from rotating with respect to shaft 15, although some rotation may occur. If so, the inner side of O-ring 29 would be in sliding contact with groove inner wall 21 and backup ring 27 in sliding contact with outer wall 22. Backup ring 27 will prevent cuttings from entering and contacting O-ring 29. As cutter 31 rotates, supporting ring 23 is free to move radially with respect to the axis of shaft 15 to accommodate radial and angular movement of cutter 31 with respect to shaft 15. This movement of supporting ring 23 allows O-ring 29 to stay in substantially the same amount of compression against seat 49, thus providing an effective seal against the entrance of external materials and sealing the lubricant.

Backup ring 27 cooperates with groove 17 to serve as means for pressing against the sides of O-ring 29 for sealing and to prevent movement of O-ring 29 along the axis of shaft 15. The backup ring 27 also helps prevent cuttings damage to O-ring 29. Piston 57 will maintain a positive pressure on the lubricant in the bearing areas. As lubricant is depleted because of frictional heat, piston 57 will move downward in reservoir 51 to maintain a supply of lubricant to the bearing areas.

The invention has significant advantages. The seal means floats with respect to the shaft to accommodate wobbling of the cutter on the shaft and maintain an effective seal. The seal is simple in construction and easy to install.

While the invention has been shown in only one of its forms, it should be apparent to those skilled in the art that it is not so limited but is susceptible to various changes and modifications without departing from the spirit of the invention.

I claim:

1. In an earth boring bit of the type having a cutter rotatably mounted with bearings on a shaft, an improved seal means located in an annular groove provided between the cutter and shaft for sealing the bearings, comprising:
   a supporting ring located in the annular groove, defining an annular space between the supporting ring and a cylindrical surface formed on the shaft and another annular space between the supporting ring and a cylindrical surface formed on the cutter;
   an elastomeric ring located in one of the annular spaces and supported by the supporting ring in sealing and sliding contact with one of the cylindrical surfaces, the other annular space being empty, the supporting ring separating the elastomeric ring from any contact with the other cylindrical surface;
   the groove having side walls spaced apart a distance that is fixed regardless of any outward movement of the cutter on the shaft, so that side squeeze on the elastomeric ring remains constant despite outward cutter movement on the shaft.

2. In an earth boring bit of the type having a cutter rotatably mounted with bearings on a shaft, an improved seal means for sealing the bearings, comprising:
   a groove located in the shaft, having an inner diameter and side walls;
   a supporting ring located in the groove, the supporting ring having a minimum inner diameter larger than the inner diameter of the groove; and
   an elastomeric ring located in an annular space provided in the groove between the supporting ring and the cutter and pressed radially outward against a seat formed in the cutter by the supporting ring;
   the sides of the elastomeric ring being pressed into sealing contact with one of the side walls of the groove, defining a seat for preventing movement of the elastomeric ring along the axis of the shaft;
   the side walls of the groove being spaced apart a distance that is fixed regardless of any outward movement of the cutter on the shaft, so that side squeeze on the elastomeric ring remains constant despite outward cutter movement on the shaft;
   the elastomeric ring being in sliding contact with one of the seats;
   the supporting ring separating the elastomeric ring from any contact with the inner diameter of the groove to allow the supporting ring to move radially with respect to the shaft.

3. In an earth boring bit of the type having a cutter rotatably mounted with bearings on a shaft, an improved seal means located in a groove formed in the shaft for sealing the bearings, comprising:
   a split supporting ring located in the groove, the supporting ring being incontractible beyond a minimum inner diameter that is larger than the inner diameter of the groove; and
   an elastomeric ring located in an annular space provided in the groove between the supporting ring and the cutter and pressed against the cutter by the supporting ring, the elastomeric ring having a cross-sectional width selected so as to provide sealing on the sides of the elastomeric ring when the cutter is assembled;
   the sealing on the sides of the elastomeric ring and the supporting ring causing the elastomeric ring to be slidingly engaged by the cutter;
   the supporting ring separating the elastomeric ring from any contact with the inner diameter of the groove to allow the supporting ring to move radially with respect to the shaft;
   the groove having integral side walls spaced-apart a distance that is fixed regardless of any outward movement of the cutter on the shaft, so that side squeeze on the elastomeric ring remains constant despite outward cutter movement on the shaft.

4. In an earth boring bit of the type having a cutter rotatably mounted with bearings on a shaft, an improved seal means for sealing the bearings, comprising:
   a groove formed in the shaft with a rectangular cross-section, an inner diameter and integral inner and outer side walls formed perpendicular to the inner diameter;
   a split supporting ring located in and extending across substantially the full width of the groove, the supporting ring having an incontractible minimum inner diameter; and
   an elastomeric ring, circular in cross-section and located in an annular space provided between the supporting ring and the cutter and pressed by the supporting ring radially outward against the cutter;
   the elastomeric ring being pressed into sealing contact with one of the side walls of the groove, preventing movement of the elastomeric ring along the axis of the shaft;
   the side walls of the groove being spaced-apart a distance that is fixed regardless of any outward movement of the cutter on the shaft, so that side squeeze on the elastomeric ring remains constant despite outward cutter movement on the shaft;
   the elastomeric ring slidingly engaging a selected one of the cutter and the groove side wall;
   the supporting ring separating the elastomeric ring from any contact with the inner diameter of the groove to allow the supporting ring to move radially with respect to the shaft.

5. In an earth boring bit of the type having a cutter rotatably mounted with bearings on the shaft, an improved seal means located in an annular groove formed in the shaft for sealing the bearings, comprising:
   a supporting ring located in the groove, the supporting ring being incontractible when assembled in the groove and having an inner diameter larger than the inner diameter of the groove, defining an annular clearance;
   a backup ring located in the groove with an inner circumference in contact with the supporting ring and an outer circumference in contact with the cutter; and
   an elastomeric ring pressed against the cutter by the supporting ring and also pressed between the backup ring and an inside wall of the groove to provide sealing on the sides of the elastomeric ring;
   the elastomeric ring being rotatable with respect to the cutter.

6. In an earth boring bit of the type having a cutter rotatably mounted with bearings on a depending shaft, an improved seal means for sealing the bearings, comprising in combination:
   an annular groove formed in the shaft with a rectangular transverse cross-section and inner and outer side walls;
   a split supporting ring located in the groove, the supporting ring being expansible and having a minimum inner diameter that is larger than the inner diameter of the groove, the supporting ring having a cross-sectional width slightly less than the cross-sectional width of the groove;

a backup ring of elastomeric material located in the groove in contact with the outer side wall, the inner circumference of the backup ring being in contact with the support ring and its outer circumference in contact with the cutter; and an elastomeric ring of circular cross-section pressed radially outward against the cutter by the supporting ring for slidingly sealing with the cutter and also pressed between the backup ring and the inner side wall of the groove, to provide sealing of the sides of the elastomeric ring.

* * * * *

UNITED STATES PATENT OFFICE
CERTIFICATE OF CORRECTION

Patent No. 4,428,687      Dated January 31, 1984

Inventor(s) Anton F. Zahradnik

It is certified that error appears in the above-identified patent and that said Letters Patent are hereby corrected as shown below:

At column 2, line 18, page 4, "or" should be --of--.

At column 2, line 52, page 4, "701480" should be --70-80--.

Signed and Sealed this

First Day of January 1985

[SEAL]

Attest:

Attesting Officer

GERALD J. MOSSINGHOFF

*Commissioner of Patents and Trademarks*